US006688624B2

(12) United States Patent
Christensen et al.

(10) Patent No.: US 6,688,624 B2
(45) Date of Patent: Feb. 10, 2004

(54) FOOT PUMP SCOOTER (75) Inventors: Donald J. Christensen, Phoenix, AZ (US); Lewis Ghiz, Tempe, AZ (US); Jonathan L. Perryman, Phoenix, AZ (US)

(73) Assignee: GCP, LLC ( * ) Notice: Subject to any disclaimer, the term of this patent is extended or adjusted under 35 U.S.C. 154(b) by 90 days.

(21) Appl. No.: 10/057,325

(22) Filed: Oct. 29, 2001

(65) Prior Publication Data

US 2002/0163159 A1 Nov. 7, 2002

Related U.S. Application Data (60) Provisional application No. 60/287,839, filed on May 1, 2001, and provisional application No. 60/318,192, filed on Sep. 7, 2001.

(51) Int. Cl.[7] .............................................. B62M 1/04
(52) U.S. Cl. ...................................... 280/255; 280/220
(58) Field of Search .............................. 280/220, 221, 280/252, 253, 255

(56) References Cited

U.S. PATENT DOCUMENTS

| | | | |
|---|---|---|---|
| 416,016 A * | 11/1889 | Schrader ..................... 74/134 |
| 1,237,969 A | 8/1917 | Stocks | |
| 1,477,544 A | 12/1923 | D'Antonio | |
| 1,511,151 A * | 10/1924 | Wilson ........................ 280/255 |
| 1,632,308 A * | 6/1927 | Mourer ....................... 280/221 |
| 1,798,971 A * | 3/1931 | Clements ................... 280/215 |
| 2,062,830 A | 12/1936 | Sabaeff ........................ 208/37 |
| 2,086,445 A | 7/1937 | Smith .......................... 208/37 |
| 2,953,389 A | 9/1960 | Green et al. .............. 280/87.04 |
| 4,696,485 A | 9/1987 | Lee ............................. 280/221 |
| 4,761,014 A * | 8/1988 | Huang ........................ 280/258 |
| 4,861,054 A | 8/1989 | Spital ......................... 280/221 |
| 4,915,403 A | 4/1990 | Wild et al. ................. 280/221 |
| 5,405,157 A | 4/1995 | Bezerra et al. ............ 280/253 |
| 5,536,029 A | 7/1996 | Gramckow ................. 280/263 |
| 6,419,251 B1 * | 7/2002 | Chueh ........................ 280/221 |

* cited by examiner

*Primary Examiner*—Kevin Hurley
(74) *Attorney, Agent, or Firm*—Gallagher & Kennedy, P.A.; Thomas D. MacBlain (57) ABSTRACT

A front wheel of a scooter is pivotally mounted to a frame and includes an upwardly extending shaft supporting a handlebar for steering the scooter. A footpad or peg or pedal, mounted on a spring returned lever, is interconnected with the rear wheel through a gear mechanism supported by the frame. By pumping the footpad, rotation of the rear wheel and forward motion of the scooter occurs. The gear mechanism includes a first gear or sprocket mounted for rotation about the arms of rotation of the rear wheel. A further sprocket coaxially mounted is linked via a drive-chain to a sprocket on an offset shaft. A further sprocket on the offset shaft drives a final, drive sprocket via a further chain. And the final sprocket drives the rear wheel through a one way clutch. Depression of the footpad, peg or pedal moves a rack-like bar longitudinally. The bar is in engagement with and drives the first gear or sprocket. The bar may carry drive-chain cross-members or pins that engage the teeth of the first sprocket.

31 Claims, 5 Drawing Sheets

FOOT PUMP SCOOTER

CROSS REFERENCE TO RELATED APPLICATIONS

The present application is directed to subject matter disclosed in and claims priority to a first provisional application entitled "FOOT-PUMP SCOOTER", filed May 1, 2001 and assigned Serial No. 60/287,839 and a second provisional application entitled "PUMP SCOOTER", filed Sep. 7, 2001 and assigned Serial No. 60/318,192.

BACKGROUND OF THE INVENTION

1. Field of the Invention

The present invention relates to scooters and, more particularly, to scooters propelled forwardly by a rider operated pivotally mounted lever.

2. Description of Related Art

Conventional scooters are propelled forwardly by a rider having one foot on a platform between the front and rear wheels and pushing rearwardly against the ground with the other foot. Such scooters are speed limited on a flat surface by the speed and power of the rider pushing rearwardly against the ground. Because of the physical effort required, scooters of this type are relatively slow and higher speeds are possible only for short periods of time.

To increase the sustainable duration at higher speed, various foot operated motive mechanisms have been developed. One type of mechanism includes a foot operated lever repetitively drawing a chain in contact with a sprocket secured to the rear wheel through a one way clutch. In another type of self propelled scooter, a pair of footpads or pegs are pumped by the rider's feet, which pumping motion is translated to rotary motion of the rear wheel. These mechanisms overcome the need to repeatedly push against the ground with one of the rider's feet but various detrimental aspects exist. For example, the resulting speed of the scooter is little more, if any, beyond that of a conventional scooter wherein the same amount of effort is applied. The dual foot pedal arrangement negates the existence of a solid platform upon which a rider may rest his feet as he wishes. Certain of the mechanisms are complex, expensive and of limited life in the environment within which a scooter is expected to be used by a child or young adult.

SUMMARY OF THE INVENTION

The present invention is directed to a scooter mechanically propelled by a rider and having a front wheel steerable through the handlebar. A spring returned arcuate lever is repetitively depressed by a rider's foot. The resulting movement of the lever rotates an engaged initial sprocket mounted on a shaft common with the rear wheel. The initial sprocket includes a one way clutch to permit return of the lever. A gear mechanism interconnects the initial sprocket with a final sprocket mounted on the shaft and keyed with the rear wheel. The final sprocket may include a one way clutch to permit freewheeling of the rear wheel. By selecting a gear ratio of the gear mechanism commensurate with the strength and weight of the rider, a significantly increased forward speed over that of a conventional foot powered scooter can be achieved.

It is therefore a primary object of the present invention to provide a foot operated mechanism for a scooter to compel forward motion.

Another object of the present invention is to provide a lever operated gear mechanism for propelling a scooter.

Yet another object of the present invention is to provide a simple foot operated gear mechanism for propelling a scooter.

Still another object of the present invention is to provide a foot operated gear mechanism adapted for use within the normal environment of a scooter without significant danger of jamming or breakdown.

A further object of the present invention is to provide a relatively inexpensive and easily repairable foot operated gear mechanism for propelling a scooter.

A yet further object of the present invention is to provide a foot operated gear mechanism intermittently actuated to permit a rider to rest while the scooter coasts.

A still further object of the present invention is to provide a method for propelling a scooter by a foot operated pumping action.

These and other objects of the present invention will become apparent to those skilled in the art as the description of the invention proceeds.

BRIEF DESCRIPTION OF THE DRAWINGS

The present invention maybe described with greater specificity and clarity with reference to the following drawings, in which.

DESCRIPTION OF THE PREFERRED EMBODIMENT

Figures 1, 2, 3:
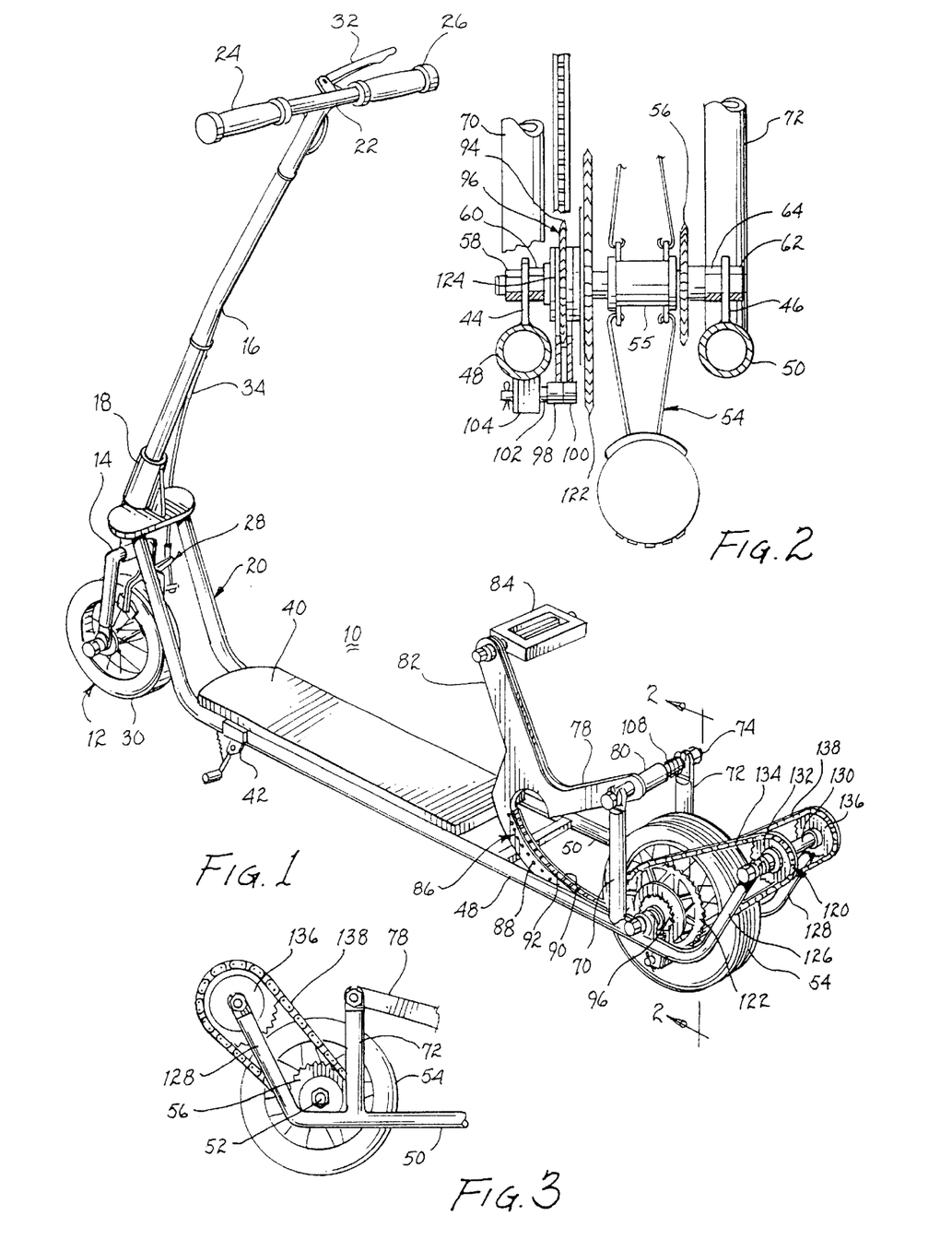
FIG. 1 illustrates a perspective view of a foot operated gear mechanism mounted on a scooter.
FIG. 2 is a cross sectional view taken along lines 2—2, as shown in FIG. 1.
FIG. 3 is a partial side view of the final stage of the gear mechanism.

Referring to FIG. 1, there is shown a perspective view of a foot pump scooter 10 embodying the present invention. A front wheel assembly 12 is rotatably mounted within a fork 14 depending from a shaft 16 rotatably mounted in a sleeve 18 or the like secured to the front of frame 20. A handlebar 22 is attached at the upper end of shaft 16 and may include handgrips 24, 26. A caliper brake assembly 28 may be mounted on fork 14 to provide a braking function for wheel 30 of the front wheel assembly. A manually operated brake handle 32 mounted upon handlebar 22 actuates the caliper brake assembly through a sheathed cable 34.

Frame 20 of foot pump scooter 10 includes a platform 40 upon which a rider may place one or both of his feet. A spring loaded kickstand 42 may be attached to the frame to permit parking the foot pump scooter in an upright orientation.

Referring jointly to FIGS. 1, 2, 3, 4, 5 and 7, details of the rear wheel assembly, it's mounting and the associated gear mechanism will be described. A pair of ears 44, 46 are secured to and extend upwardly from longerons 48, 50 of frame 20 to support and retain axle 52. The ears may include forwardly oriented slots to accommodate removal of the wheel assembly and to adjust the tension of the chains of the gear mechanism. The wheel mechanism includes a wheel 54 and hub 55 rotatably mounted upon axle 52. A final sprocket 56 is attached to the wheel and includes a one way clutch to permit rotation of the wheel in the forward direction of the scooter without requiring commensurate rotation of the sprocket. However, rotation of the sprocket in the forward direction compels commensurate rotation of the wheel through the clutch. As is conventional, nuts 58, 60 threadedly engage axle 52 and secure ear 44 therebetween. Similarly, nuts 62, 64 threadedly engage the axle and secure ear 46 therebetween. A pair of stanchions 70, 72 extend upwardly from longerons 48, 50, respectively, of frame 20. The upper ends of these stanchions support a shaft 74 extending therebetween. A lever assembly 76 includes an arm 78 terminated by a sleeve 80 rotatably mounted upon shaft 74. Thereby, level assembly 76 is rotatable about the axis of shaft 74. The lever assembly includes a forwardly extending lever 82 supporting at it's extremity a footpad, peg or pedal 84. The footpad, peg or pedal may be rotatably attached to the lever in the conventional manner of a foot pedal for a bicycle. The footpad, peg or pedal 84 and its attached lever 82 provide the foot drive for the gear mechanism.

Figure 4:
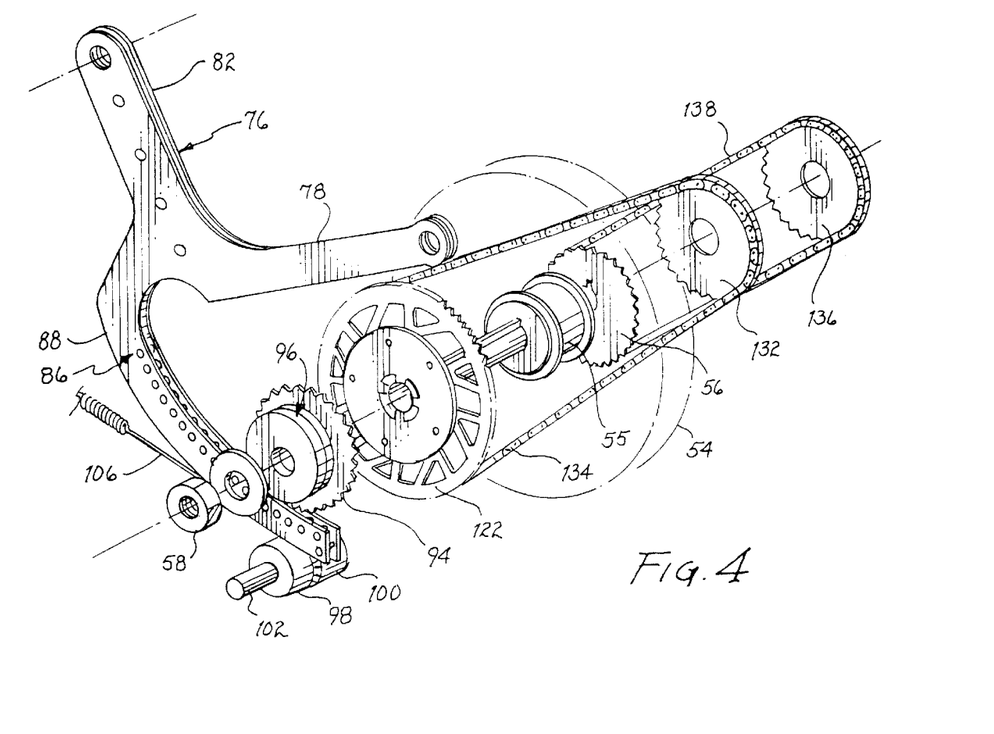
FIG. 4 is an exploded view of the gear mechanism.
Figure 5:
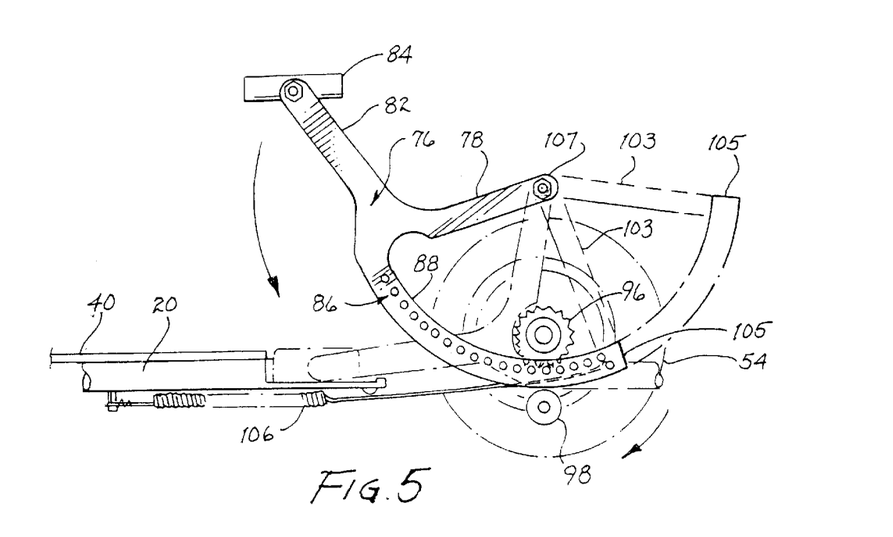
FIG. 5 illustrates the movement of the foot operated lever.

A ratchet-like bar or rack 86 of the lever assembly extends rearwardly. It is of constant curvature and has an axis of rotation defined by shaft 74. Bar 86 may have attached thereto a length of conventional bicycle chain or it may include a pair of sidewalls 88, 90 between which are mounted a plurality of rods 92 spaced apart from one another and similar to corresponding rods or pins that are the cross members of a conventional bicycle chain. The rods of bar 86 engage teeth 94 of an initial or first gear in the form of a sprocket 96. As shown in FIGS. 1, 4 and 5, the arm 78 and the elongate member that is the bar 86 form the arms of a single-piece yoke straddling the first gear 96. The outer race of one or a pair of bearings 98, 100 are mounted upon a stud 102 secured to longeron 48 through a block 104. The purpose of these bearings is to insure continuing engagement of bar 86 with sprocket 96. Alternatively, a bar or strut 103 (shown in dashed lines) may interconnect end 105 of bar 86 with journaled end 107 of arm 78 (see FIG. 5). The variation relieves certain loads ) on bar 86 and bearings 98, 100 may be eliminated. Either prevents deflection of the bar 86 away from the gear 96 so as to disengage the sprocket from the rods 92. A spring 106 (see FIG. 4) is secured intermediate the extremity of bar 86 and an anchor on frame 20 to return the bar to its forward position absent pressure on footpad 84. Alternatively, a predetermined tension spring 108 (see FIG. 1) may be mounted on shaft 74 to return lever assembly 74 to the initial position.

Upon downward movement of the footpad or peg, lever assembly 76 will rotate downwardly about the axis of shaft 74 and result in curvilinear movement of bar 86. Such movement of the bar will produce rotation of sprocket 96 due to the resulting consecutive engagement of rods 92 with teeth 94 of the sprocket. When the footpad or peg is in its lower most position, pressure is removed from the footpad or peg and the force of spring 106 (or tension spring 108) will draw bar 86 forwardly and rotational movement of lever assembly 76 to its initial position will occur. Commensurate rotation of first sprocket 96 in the opposite direction will also occur.

Referring jointly to FIGS. 2, 4, 5 and 7, further details of gear mechanism 120 will be described. First sprocket 96, mounted upon axle 52, is in engagement with second sprocket 122 through a one way clutch 124 whereby rotation of the first sprocket in one direction corresponding with downward stroke of lever assembly 76 will result in corresponding rotation of second sprocket 122, but rotation of the first sprocket in the other direction will have no effect upon the second sprocket. A pair of uprights 126, 128 extend from the rear of frame 20 and rotatably support a shaft 130. A third sprocket 132 is fixedly attached to shaft 130. A loop of conventional bicycle chain 134 interconnects the third sprocket with the second sprocket. A fourth sprocket 136 is fixedly attached to shaft 130. Thus, rotation of third sprocket 132 will result in rotation of shaft 130 and fourth sprocket 136. The fourth sprocket is attached to final sprocket 56 by a loop of conventional bicycle chain 138.

The number of revolutions of first sprocket 96 is a function of the number of rods 92 present within bar 86 and therefore controls the number of revolutions of the first sprocket per downward stroke. The size of second sprocket 122 is significantly greater than the size of first sprocket 96. The size of third sprocket 132 is significantly smaller than the size of the second sprocket and as these two sprockets are interconnected by chain 134, the number of revolutions of the third sprocket per revolution of the second sprocket is a function of the respective ratio of teeth. Third sprocket 132 may be the same size as fourth sprocket 136, as illustrated, or the fourth sprocket may be of greater size. Final sprocket 56 may be of smaller size than fourth sprocket 136 resulting in the final sprocket rotating more than one revolution per revolution of the fourth sprocket as a ratio of the respective number of teeth as the two are interconnected with chain 138. Wheel 54 will rotate along with final sprocket 56 in one direction as a result of the one way clutch disposed therebetween.

By inspection and a basic understanding of gear mechanisms, it is evident that gear mechanism 120 will result in final sprocket 56, and wheel 54, rotating at a greater rate of rotation than sprocket 96. This difference in rate of rotation is a function of the relative sprocket sizes (i.e. gear ratio) and may be changed by changing the size of one or more of the sprockets.

Figure 6A:
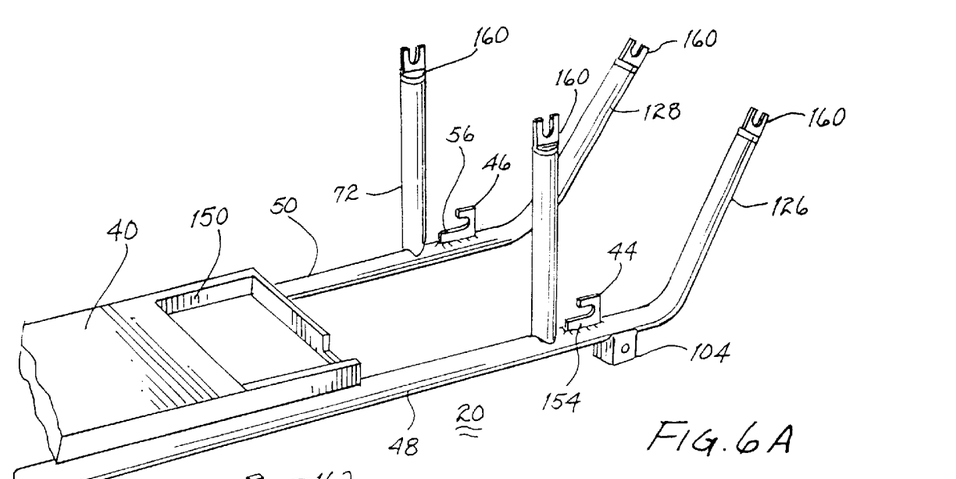
FIGS. 6a and 6b illustrate the support structure for the gear mechanism.
Figures 6B, 7:
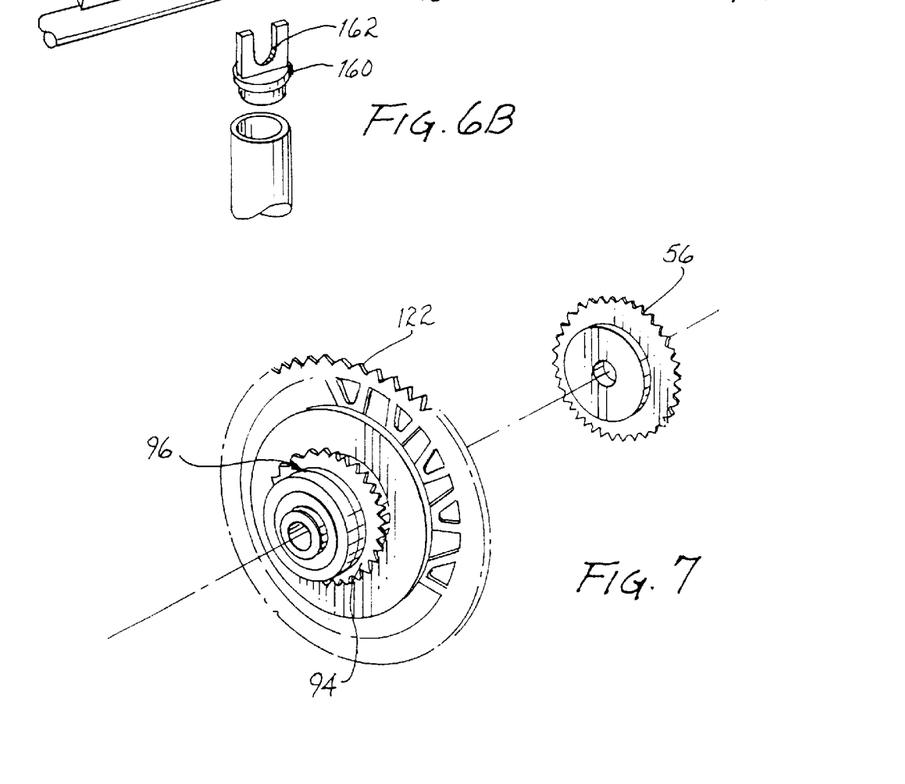
FIG. 7 illustrates the common axis of the initial and final sprockets of the gear mechanism.

Referring jointly to FIGS. 6a and 6b, details of frame 20 supporting components of gear mechanism 120 will be described in further detail. Platform 40 may include an indentation 150 for receiving the footpad, peg or pedal 84, whereby it can become a part of platform 40 and provides an essentially planar surface upon which a rider may rest his feet. Thus, when lever assembly 76 is in its lowered position, foot pump scooter 10 may be used as a conventional scooter without interference from the lever assembly. As illustrated, a notch 152 may be incorporated to receive the corresponding part of lever 82. A simple locking mechanism may be added (not shown) to permit the lever assembly to be latched in the depressed position.

The above described slots in ears 44, 46 are illustrated in FIG. 6a and identified by reference numerals 154, 156. These slots permit fore and aft adjustment of axle 52 to place appropriate tension upon chains 134, 138 and to securely attach the axle to frame 20. The upper ends of uprights 70, 72 may include an insert 160 shown in FIG. 6b. This insert includes a slot 162 for receiving shaft 74. Similar inserts may be mounted at the upper ends of uprights 126, 128 to engage and retain by nuts or the like the shaft 130. As shaft 130 must translate rotational movement of the third sprocket to the fourth sprocket, the shaft must be journaled within the inserts at the ends of uprights 126, 128, which journals are not shown as they are well known to those skilled in the art. Block 104, for supporting bearings 98, 100, extends downwardly from the bottom of longeron 48 to position the bearings adjacent the lower edge of bar 86.

Figure 8:
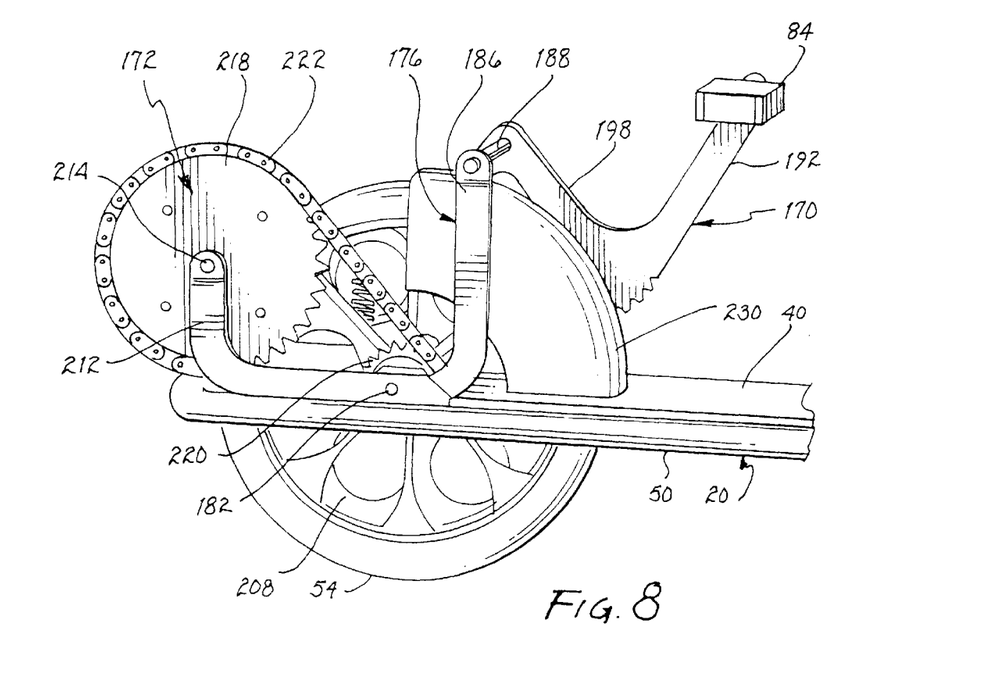
FIG. 8 illustrates a first side view of a variant gear mechanism.
Figure 9:
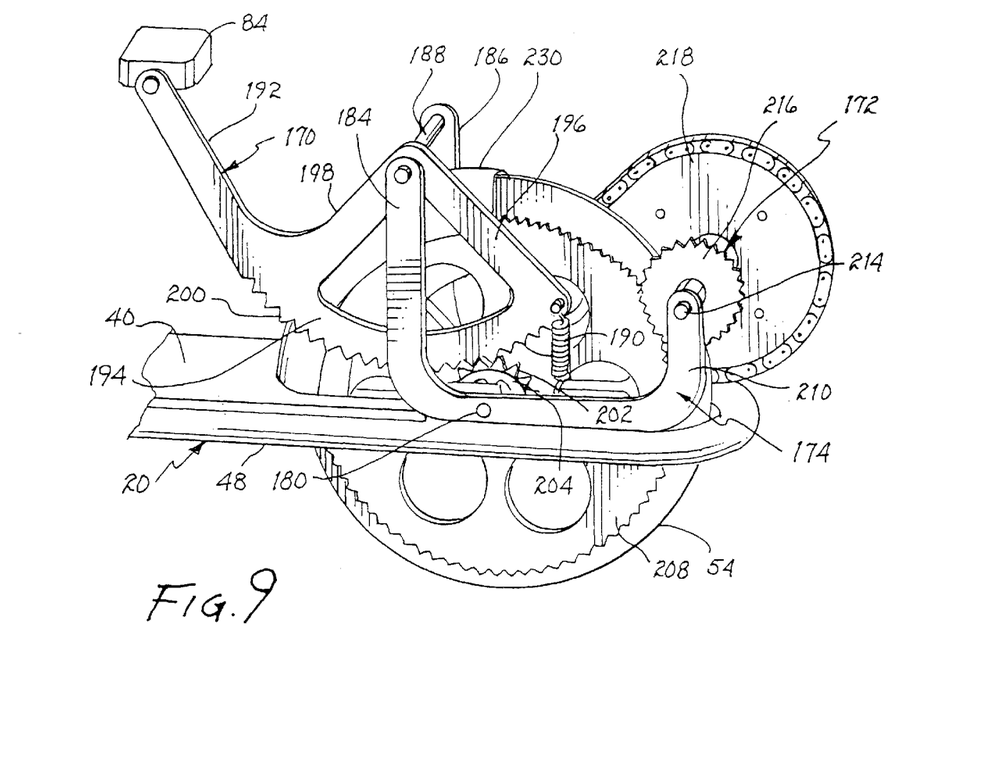
FIG. 9 illustrates another side view of the variant gear mechanism.

FIGS. 8 and 9 illustrate a lever assembly 170 that is a variant of lever assembly 76 and a variant gearing 172 of the gearing 120. For common elements previously shown and described, the same reference numerals will be used. A pair of U-shaped support members 176, 176 are attached to longerons 48, 50, respectively, of frame 20. Member 174 includes an aperture 180 for receiving and engaging by axle 52 (not shown); similarly, member 176 includes an aperture 182 for supporting the axle. The ends of arms 184, 186 support a shaft 188. Variant 170 of the lever assembly is pivotally mounted upon shaft 88 to permit pivotal movement of the variant in response to a downward force applied to footpad, peg or pedal 84 or in response to spring 190. The variant includes a lever 192 for supporting footpad, peg or pedal 84. An arced bar 194 is an elongate curvilinear member that extends rearwardly from lever 192. An arm 196 extends from essentially the rearward extremity of bar 194 and a second arm 198 extends from essentially the junction between bar 194 and lever 192. The two arms are joined to one another and pivotally supported by shaft 188 and in turn support the bar 194 at or near its ends. Upon downward motion of footpad 84 or peg or under the urging of spring 190 (or a tension spring 108), variant 170 will rock in one direction or the other about the axis of shaft 188. Again the bar 194 and the arm 198 may be viewed as a single piece yoke and the arm 196 as a strut supporting an end of the bar 194.

Bar 194 of variant level assembly 170 defines an arc about the axis of shaft 188. The periphery of the arc portion of the bar includes a plurality of teeth 200. These teeth engage with teeth 202 of sprocket 204, the latter being rotatably mounted on the axle (not shown) supporting wheel 54. As shown in FIGS. 8 and 9, the toothed bar 194 and sprocket 204 are formed here as a rack and pinion gear set. Thereby, upon depressing footpad 84 or a peg, the assembly 170 will pivot resulting in rotation of sprocket 204. A gear 208 of greater diameter than pinion gear sprocket 204 is mechanically attached to that sprocket, whereby the gear rotates along with the sprocket. Sprocket 204 includes a one way clutch to permit rotation of the sprocket in one direction without rotation of gear 208. Support members 174, 176 include uprights 210, 212, respectively, for rotatably supporting a shaft 214. A gear 216 includes teeth for meshing with the teeth of gear 208 whereby gear 208 imparts rotary motion to gear 216 resulting in rotation of shaft 214. A sprocket 218 is fixedly attached to shaft 214 whereby the sprocket will rotate with rotation of gear 216. A sprocket 220 is attached to wheel 54 through a one way clutch. A chain 222, such as a conventional bicycle chain, interconnects sprocket 218 with sprocket 220.

Upon depressing footpad 84, the lever assembly 170 will pivot about shaft 188 and rotate the sprocket 204, rotating the gear 208 to impart rotary motion to the gear 216. The rate of rotation of gear 216 relative to gear 208 is a function of the ratio of the respective teeth. That is, due to the difference in size, gear 216 will rotate at a greater rate of rotation than gear 208. The rotation of gear 216 rotates the sprocket 218. Rotation is imparted to sprocket 220 through chain 222. The rate of rotation of sprocket 220 is greater than the rate of rotation of sprocket 218 as a function of the ratio of the respective number of teeth. When footpad, peg or pedal 84 is permitted to rise in response to spring 190 (or tension spring 108,) sprocket 204 will rotate in the opposite direction. However, as this sprocket is secured to gear 208 through a one way clutch, rotation of this gear will not occur. Correspondingly, wheel 206 will continue to rotate as a result of forward movement of the foot pump scooter and such rotation is not impeded by the lack of rotation of sprocket 220 due to the interconnecting one way clutch.

A guard 230, similar to a mud guard, serves the primary function of preventing injury to the feet of a rider by contact with either wheel 54 or any of the gears/sprockets/chains associated with variant gear mechanism 172.

Figure 10:
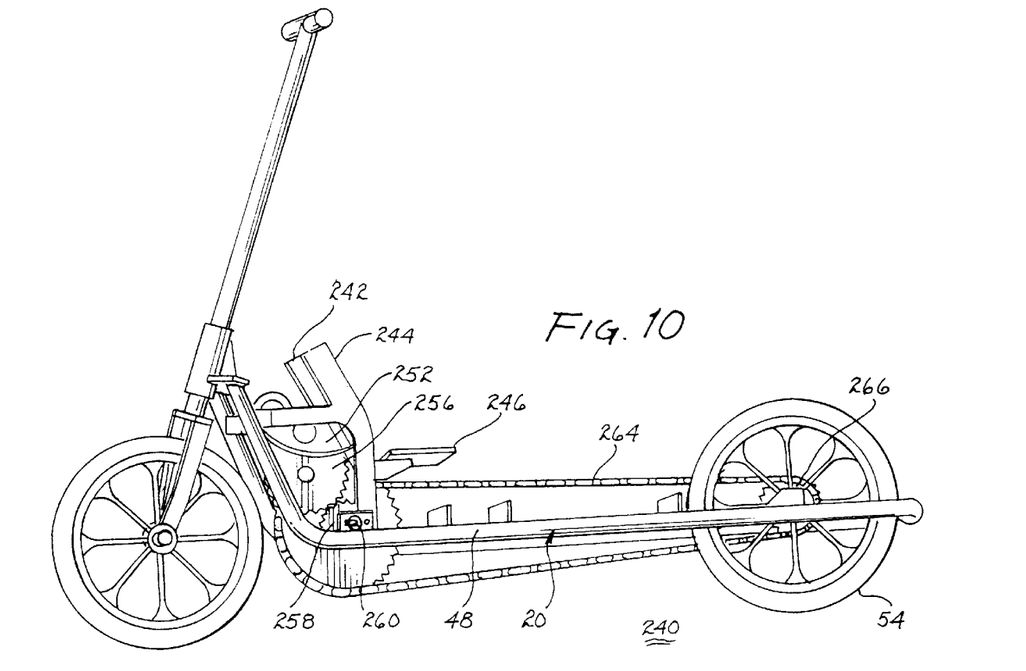
FIG. 10 illustrates a gear mechanism mounted at the front of the scooter for driving the rear wheel.
Figure 11:
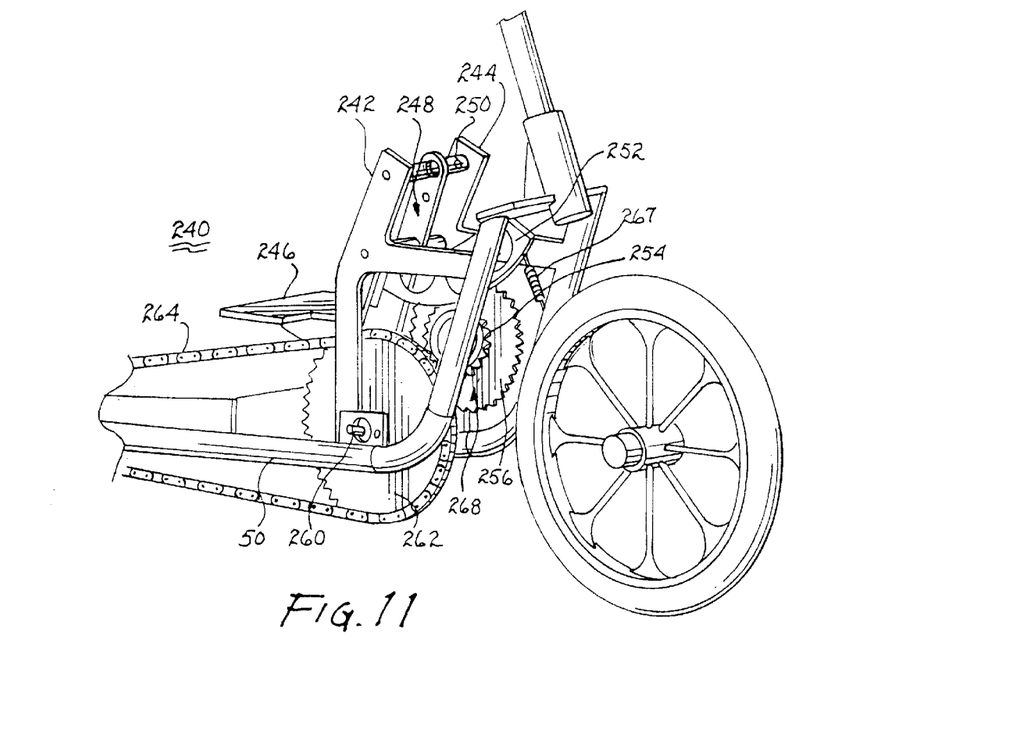
FIG. 11 illustrates a further view of the front mounted gear mechanism.

Referring jointly to FIGS. 10 and 11, a front drive variant 240 is illustrated. Common elements previously described have corresponding reference numerals. A pair of frame members 242, 244 are secured to frame 20 of the scooter 240. A footpad, peg or pedal 246 is attached to a variant lever assembly 248, which variant lever assembly is pivotally mounted on a shaft 250 supported by members 242, 244. A curved bar 252, similar to bar 86 shown in FIGS. 4 and 5, meshes with the teeth of a sprocket 254. The sprocket is mounted through a one way clutch upon a shaft extending between members 242, 244 (the shaft is not shown for purposes of clarity of illustration). A gear 256 is in engagement with sprocket 254, whereby the gear will rotate with rotation of the sprocket 254. A further gear 258 is mounted upon a shaft 260 supported by frame 20 or the shaft may be supported by members 242, 244. A sprocket 262 is also mounted on shaft 260 and in mechanical engagement with gear 258 to provide rotation of sprocket 262 with rotation of the ear. A chain 264, such as a conventional bicycle chain, interconnects sprockets 262 with sprocket 266 associated with wheel 54 through a one way clutch. Thereby, rotation of sprocket 262 will rotate sprocket 266 as a function of the ratio of teeth of the respective sprockets. It may be maybe noted that gear 256 is of greater diameter than gear 258 whereby the rate of rotation of gear 258 is greater than that of gear 256 as a function of the ratio of their respective number of teeth. Thereby, gear mechanism 268 mounted at the front of the scooter 240 provides an opportunity to impart the relatively high speed of rotation to wheel 54 as a function of repetitive pumping of footpad 246. Pivotal return of the lever assembly 248 may be effected by a spring 267 interconnecting bar 252 (or another appropriate element of the lever assembly 248) with frame 20 or one of members 242, 244. Thereby, after the footpad 246 is depressed to urge ultimate rotation of wheel 54 and upon release of pressure on the footpad it will automatically return to its raised position.

Although preferred embodiments of the invention have been described in detail, it will be 22 readily appreciated by those skilled in the art that further modifications, alterations and additions to the invention embodiments disclosed may be made without departure from the spirit and scope of the invention as set forth in the appended claims.

We claim:

1. A foot pump scooter comprising in combination:
   a) a frame for supporting a steerable front wheel and a rear wheel;
   b) a gear mechanism adapted to impart rotary motion to said rear wheel;
   c) a footpad adapted to be depressed by a rider to pivot a level assembly resulting in curvilinear motion for actuating said gear mechanism; and
   d) the frame including a platform and an indentation disposed in said platform for receiving said footpad.

2. A method for urging movement across a surface of a scooter having a steerable front wheel and a rear wheel, said method comprising the steps of:

a) depressing a foot pad from an upper position to a lower position;
b) rotating an initial sprocket in response to said step of depressing;
c) urging rotation of the rear wheel in one direction by rotating a final sprocket;
d) increasing the rate of rotation of the final sprocket relative to the initial sprocket with a gear mechanism; and
e) further comprising:
rotating the initial sprocket, the rear wheel and the final sprocket about a common axis of rotation.

3. A foot pump scooter comprising in combination:
a) a frame for supporting a steerable front wheel, a rear wheel rotatable on a rear axle and a platform therebetween;
b) an actuatable gear mechanism adapted to impart rotary motion to said rear wheel for urging forward motion of said scooter;
c) a footpad adapted to be depressed by a rider's foot to pivot a spring returned lever assembly having an arcuate bar for actuating said gear mechanism;
d) the gear mechanism comprising:
   (i) a first sprocket mounted for rotation on the rear axle and engaged by sprocket drive pins carried by the arcuate bar,
   (ii) a second sprocket mounted on the rear axle and coupled to the first sprocket to be driven thereby,
   (iii) a shaft carried by the frame and having a further pair of sprockets mounted thereon and connected for rotation together,
   (iv) a first chain linking the second sprocket in driving relation to one of the sprockets of the further pair of sprockets,
   (v) a second chain linking the remaining of the further pair of sprockets in driving relation to a final sprocket carried on the rear axle for rotation, and
   (vi) a one-way clutch carried on the rear axle and coupling the final sprocket to the rear wheel to rotate the rear wheel in one direction, impelling the scooter forward.

4. A foot pump scooter comprising:
a) a frame supporting a steerable front wheel, a rear wheel and a rider support;
b) a foot drive mounted to the frame;
c) a gear mechanism interconnecting the foot drive and the rear wheel in driving relation to the rear wheel;
d) the gear mechanism comprising:
   (i) an elongate member operatively connected in driven relation to the foot drive,
   (ii) the elongate member being connected in driving relation to a first rotary gear mounted for rotation about a first axis of rotation the same as that of the rear wheel,
   (iii) the first gear being linked in driving relation to a second, intermediate rotary gear mounted for rotation about a further axis,
   (iv) the second, intermediate gear being linked to a final rotary gear mounted for rotation about the first axis of rotation of the first rotary gear and the rear wheel and coupled in driving relation to the rear wheel.

5. The scooter according to claim 4, wherein the foot drive comprises a lever pivotally mounted to the frame and interconnecting a foot pad and the elongate member.

6. The scooter according to claim 4, wherein the elongate member is a toothed rack and the first rotary gear is a pinion gear in engagement with the rack.

7. The scooter according to claim 6, wherein the toothed rack is curvilinear.

8. The scooter according to claim 4, wherein the elongate member comprises at least one substantially rigid bar supporting a set of drive chain cross-members and the first gear is a sprocket.

9. The scooter according to claim 8, wherein the second, intermediate gear is a second, intermediate sprocket and is linked by a drive chain to a sprocket connected to and driven by the first gear.

10. The scooter according to claim 9, further comprising a further intermediate sprocket coaxially connected with the second, intermediate sprocket, the final drive gear being a sprocket and connected in driven relation by a drive chain to the further intermediate sprocket.

11. The scooter according to claim 4, wherein the elongate member is one arm of a single piece yoke straddling the first rotary gear.

12. The scooter according to claim 11, further comprising a supporting bearing engaging the one arm of the yoke opposite the first rotary gear, the supporting bearing resisting deflection in the one arm of the yoke.

13. The scooter according to claim 11, further comprising a supporting strut interconnecting the one arm and a further arm of the yoke, the strut resisting deflection in the one arm of the yoke.

14. A foot pump scooter as set forth in claim 4, including a one way clutch interconnecting the first gear and a next following gear.

15. A foot pump scooter as set forth in claim 4, including a spring return for urging return movement of the elongate member.

16. A foot pump scooter as set forth in claim 4, wherein said gear mechanism includes a one way clutch functionally intermediate said final gear and said rear wheel.

17. A foot pump scooter as set forth in claim 4, wherein the gear mechanism has gear ratios causing rotation of the final gear at a greater rate of rotation than the first gear.

18. A foot pump scooter as set forth in claim 4, wherein said frame includes a pair of stanchions pivotally supporting the elongate member and foot drive.

19. A foot pump scooter comprising:
a) a frame supporting a steerable front wheel, a rear wheel and a rider support;
b) a foot drive mounted to the frame;
c) a gear mechanism interconnecting the foot drive and the rear wheel in driving relation to the rear wheel;
d) the gear mechanism comprising:
   (i) a sprocket linked to a one-way clutch in driving relation to the rear wheel for propelling the scooter in the forward direction; and
   (ii) an elongate sprocket-drive member engaging the sprocket and connected with the foot drive for movement by a user's foot engaging the foot drive; and
   (iii) the elongate member comprising at least one substantially rigid bar supporting a series of drive chain cross-members, the series being spaced lengthwise along the bar and engaging teeth of the sprocket for driving the sprocket upon activation of the foot drive and longitudinal movement of the bar.

20. The scooter according to claim 19, wherein the at least one substantially rigid bar comprises a pair of substantially parallel bars bridged by the series of drive chain cross members.

21. The scooter according to claim 20, wherein the substantially parallel bars are a pair of side flanges of an elongate channel member.

22. The scooter according to claim 19, wherein the drive chain cross members are provided by a length of drive-chain secured to and supported by the at least one elongate member.

23. The scooter according to claim 19, including means for opposing deformation of the at least one bar.

24. The scooter according to claim 19, including a supporting bearing engaging the at least one bar opposite the sprocket, the supporting bearing resisting deflection in the at least one bar.

25. The scooter according to claim 19, wherein the elongate sprocket-drive member is one arm of a pivoted, single piece yoke and is supported proximate one end thereof by a further arm of the yoke extending between the one end and a pivotal support and restrained against deflection by a strut extending from proximate a further end of the elongate sprocket-drive member and the pivotal support.

26. The scooter according to claim 25, wherein the yoke straddles the sprocket.

27. The scooter according to claim 19, wherein the sprocket is operatively coupled to the rear wheel via intermediate gearing coupled to the one-way clutch.

28. The scooter according to claim 27, wherein the intermediate gearing includes at least a further pair of sprockets linked by a drive chain.

29. The scooter according to claim 28, wherein the intermediate gearing further comprises an additional pair of sprockets linked to the one-way clutch.

30. A scooter including:
a) a frame supporting a front wheel and a rear wheel,
b) a platform supported on the frame between the front wheel and the rear wheel,
c) a foot-operated drive including:
   (i) a single foot-operated lever biased by a spring to a position protruding above the platform and depressible downward by foot against the bias of the spring,
   (ii) a first pivotally mounted substantially rigid elongate drive member connected with the lever and having a run of gear engagement elements,
   (iii) a first rotatable gear engaged in driven relation by the gear engagement elements of the elongate drive member,
   (iv) at least one further drive member in driving relation to the rear wheel and driven by rotation of the first rotatable gear,
d) the run of gear engagement elements moving substantially forward and backward of the scooter at the location of engagement with the first rotatable gear when the lever is depressed and released.

31. The scooter according to claim 30, wherein the run of gear engagement elements engages the first rotatable gear at substantially its bottom.

* * * * *